United States Patent [19]

Kiely

[11] 4,285,675

[45] Aug. 25, 1981

[54] MULTI-FUNCTION VARIABLE SPEED DRIVE

[76] Inventor: Denis M. Kiely, Killarney Hill House, Ardmore Park, Bray, County Wicklow, Ireland

[21] Appl. No.: 165,881

[22] Filed: Jul. 3, 1980

Related U.S. Application Data

[63] Continuation of Ser. No. 961,166, Nov. 16, 1978, abandoned.

[30] Foreign Application Priority Data

Dec. 12, 1977 [IE]  Ireland ................................ 2516/77

[51] Int. Cl.³ ............................................ F16H 55/52
[52] U.S. Cl. ........................................ 474/19; 474/46
[58] Field of Search ...................... 474/12, 19, 21, 43, 474/46

[56] References Cited

U.S. PATENT DOCUMENTS

| | | | |
|---|---|---|---|
| 2,891,410 | 6/1959 | Papageorges | 474/21 |
| 2,905,005 | 9/1959 | Miner | 474/19 |
| 2,951,388 | 9/1960 | Tacquet | 474/19 |
| 3,224,287 | 12/1965 | Gesche et al. | 474/19 |
| 3,395,587 | 8/1968 | Casini | 474/12 |

FOREIGN PATENT DOCUMENTS

| | | |
|---|---|---|
| 1190282 | 4/1965 | Fed. Rep. of Germany . |
| 30003 | of 1913 | United Kingdom ................ 474/19 |
| 368050 | 3/1932 | United Kingdom . |
| 742914 | 1/1956 | United Kingdom . |
| 778403 | 7/1957 | United Kingdom . |
| 807160 | 1/1959 | United Kingdom . |
| 1363504 | 8/1971 | United Kingdom . |
| 1298816 | 12/1972 | United Kingdom . |

Primary Examiner—C. J. Husar
Assistant Examiner—Conrad Berman
Attorney, Agent, or Firm—Griffin, Branigan & Butler

[57] ABSTRACT

The present invention relates to a multifunction variable speed drive. There is provided a drive pulley of variable effective diameter and a follower pulley of variable effective diameter, a flexible belt passing around both pulleys and means for applying adjustable forces to the drive pulley. A constant drive ratio between the pulleys is obtained when two opposing forces on the drive pulley are in equilibrium. The drive ratio between the pulleys falls with increasing load and vice versa.

21 Claims, 7 Drawing Figures

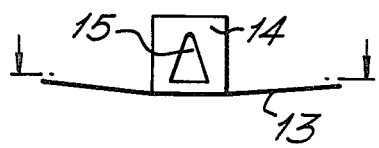
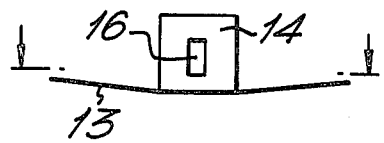
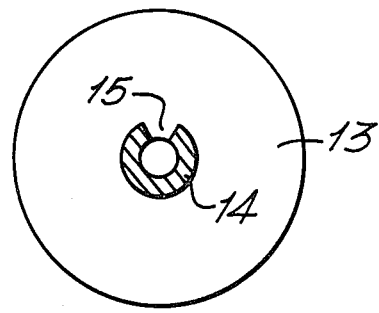
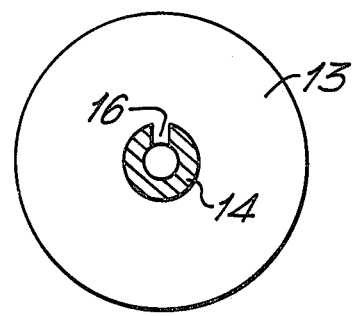
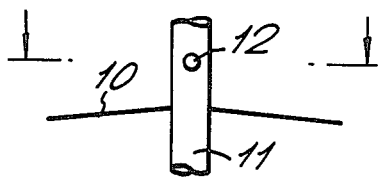
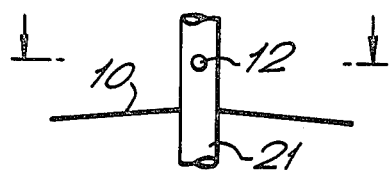
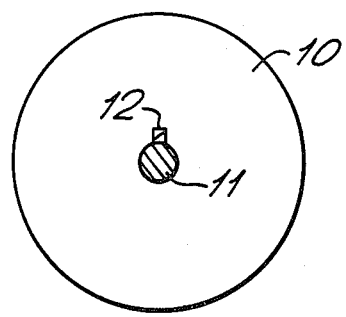
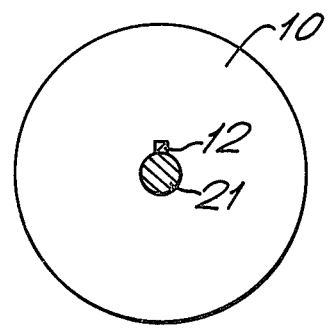
DRIVE PULLEY
FOLLOWER PULLEY
FIG.2A.
FIG.2B.

MULTI-FUNCTION VARIABLE SPEED DRIVE

This is a continuation of application Ser. No. 961,166 filed Nov. 16, 1978.

This invention relates to a variable speed drive and has for its object the provision of a variable speed drive suitable for use in a battery powered electric vehicle.

According to the present invention, there is provided a variable speed drive for a battery powered electric vehicle, the drive comprising a drive pulley of variable effective diameter, mounted on a drive shaft a follower pulley of variable effective diameter mounted on a drive shaft, a flexible belt passing around both pulleys and serving to transmit power from the drive pulley to the follower pulley, means for automatically adjusting the effective diameter of the follower pulley in accordance with that of the drive pulley to maintain the flexible belt under tension, manually-operable accelerator means coupled to the drive pulley for applying a manually adjustable force thereto tending to increase the effective diameter of the drive pulley and thereby increase the drive ratio of the pulleys, and means mechanically coupling the drive shaft to the drive pulley for automatically applying an opposite force to the drive pulley tending to decrease the effective diameter thereof and thereby decrease the drive ratio of the pulleys, the opposite force having a magnitude which increases with increasing load torque and vice versa, the arrangement being such that a constant drive ratio between the pulleys is obtained when the two opposing forces on the drive pulley are in equilibrium and the drive ratio between the pulleys falls with increasing load and vice versa Embodiments of the invention will now be described by way of example with reference to the accompanying drawings, in which, FIG. 1 is a schematic illustration of a direct drive according to invention in the at rest condition, the upper part of the figure showing the relative positions of the pulleys and drive belt in side view;

FIG. 2A shows schematically the two components of the drive pulley which is used in the FIG. 1 embodiment, each component being shown in both plan and side view;

FIG. 2B Similarly shows the components of the follower pulley used in the FIG. 1 embodiment;

Figure 1:
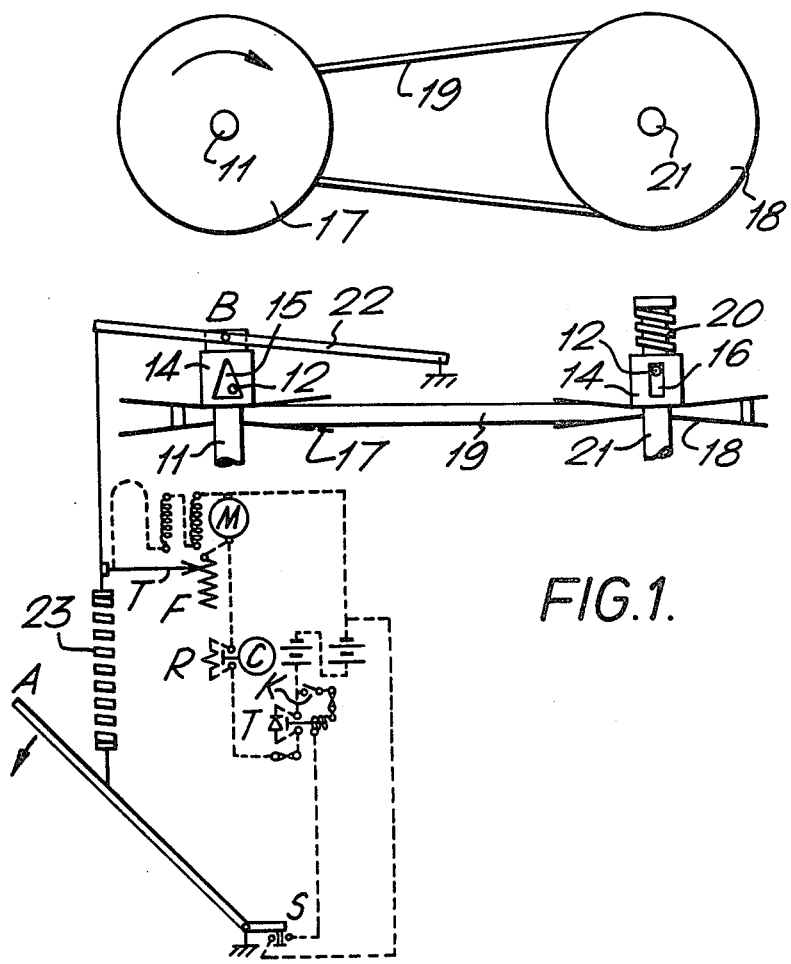

Referring now to the drawings, the direct drive shown in FIG. 1 is assumed to be incorporated in a battery powered electric vehicle and uses variable diameter split drive and follower pulleys 17 and 18 respectively and a wide vee belt 19. The components are available commercially.

FIGS. 2A and 2B show the separate parts of the drive and follower pulleys, respectively, which are used in the direct drive of FIG. 1. In each case, one pulley face 10 is fixed to a shaft 11 or 21 which also has a tapped hole to receive a drive pin 12. The other pulley face 13 is fixed to a sleeve 14 which can slide along the shaft. In the case of the drive pulley, the shaft to which the face 10 is fixed is the drive shaft 11 of the motor M (FIG. 1), whereas in the case of the follower pulley, the shaft is the shaft 21 serving as output.

The sleeve 14 of the drive pulley 17 has a triangular or trapezium shaped or other slot 15 with sloping sides and the sleeve 14 of the follower pulley 18 has a rectangular slot 16 as shown. Each pulley is assembled by inserting the drive pin 12 through the slot 15 or 16 in the sleeve 14. The movement of each pulley face relative to its opposite face is therefore restricted to the movement of the drive pin in its slot.

FIG. 1 shows the assembled direct drive in the rest condition. The driving motor M is a shunt wound motor whose speed may be increased by increasing the amount of the field resistance F in the circuit in the normal way. C is a centrifugal switch which is driven by the motor M and which operates a series-parallel controller to give half battery voltage and full field strength at starting and which short-circuits the starting resistor R as the motor speeds up. T is a simple two-terminal reverse blocking diode thysistor which switches only for positive anode to cathode voltages and exhibits a reverse blocking state for negative anode to cathode voltages.

The basic electrical connections are shown dotted. For clarity the reversing circuit and all subsidiary and interlock circuits are omitted. Belt tension is maintained by the action of a spring 20 pressing the follower pulley faces together and final drive is by reduction gearing (not shown) from the shaft 21 to a wheel of the vehicle.

The drive is started by closing a key switch K and partially depressing an accelerator pedal A to close a switch S. The motor M then runs up to full speed in a clockwise direction and the follower pulley 18 runs at minimum speed as shown in FIG. 1.

Further downward movement of the accelerator pedal A applies a force (accelerating force) at the point B which tends to increase the load speed by closing the faces of the drive pulley 17 thus increasing its effective diameter and reducing the effective diameter of the follower pulley 18. The accelerating force is applied at the point B, via a pivotted lever 22 by a spring 23 in tension between the pedal A and the free end of the lever 22. Pressure on the pedal A thus provides an accelerating force which tends to accelerate the vehicle, but this force is opposed by the load torque as the pressure of the drive pin 12 on the right hand sloping face of the drive pulley slot 15 exerts a force which tends to open the faces of the drive pulley.

For any given accelerator pedal position, the speed of the vehicle is constant at that value at which these two opposing forces are equal. It follows from this that an increase in load produces a force which is now greater than the accelerating force and the vehicle speed falls.

Figure 7:
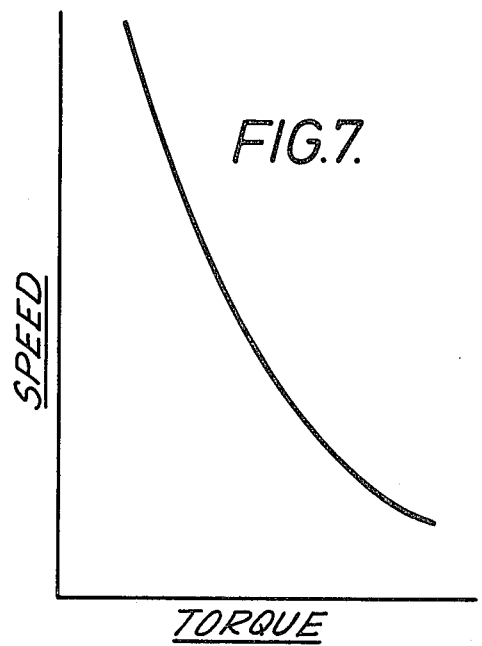
FIG. 7 illustrates the torque/speed characteristic of the drive.

This characteristic of falling speed with increasing load is most advantageous for conserving the limited energy available from electric traction batteries and is similar to the characteristic of the series motor shown in FIG. 7. The series motor is used extensively for battery powered electric drives mainly because of its speed-load characteristic; however, the present drive has the further advantage that by altering the variables such as slot contour, drive speed and spring tension, the speed-load characteristic may be optimised for any particular vehicle.

Figure 3:
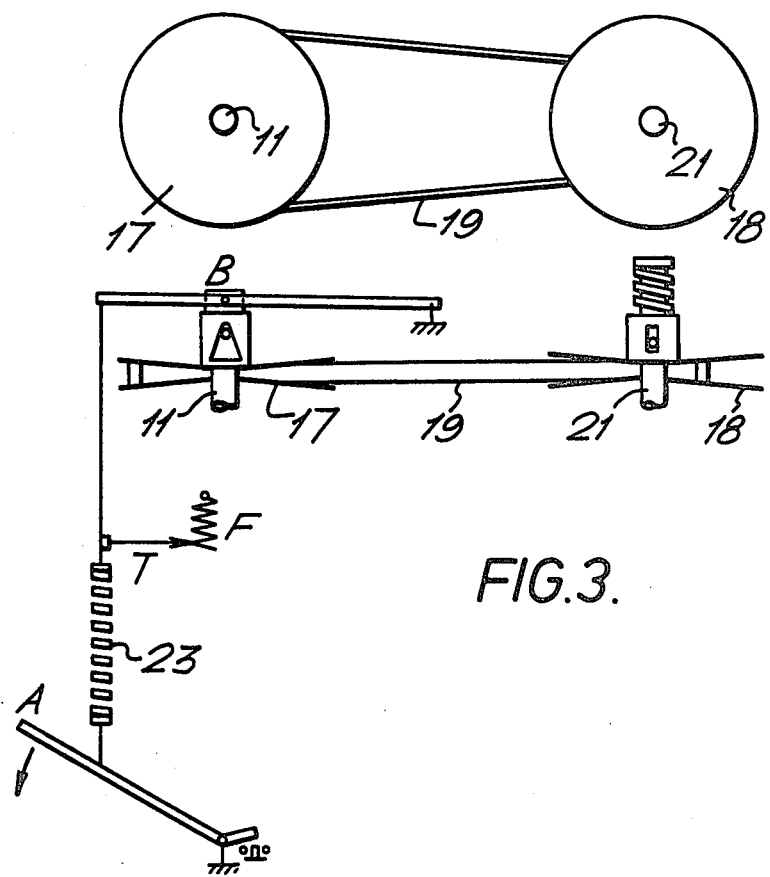
FIG. 3 shows the direct drive of FIG. 1 in the full forward speed condition, the upper part of the figure again showing the relative positions of the pulleys and drive belt in side view.

Acceleration takes place when the accelerating force overcomes the load torque force. If the accelerator pedal is fully depressed, full vehicle speed is eventually reached when the drive pulley faces are fully closed and the field resistance F is fully in circuit as schematically shown in FIG. 3. In this connection, it is to be noted that due to the potentiometer slider T whose tapping point along the field resistance F is determined by the separation of the two parts of the pulley 17, the amount of the field resistance F in the circuit and thus the speed of the motor M increases with increasing effective diameter of the pulley 17.

If the maximum pulley diameter is twice the minimum pulley diameter, the follower pulley shaft 21 has a speed ratio of 4 to 1. If, in addition the motor speed may be increased to three times normal speed by increasing the field resistance the load shaft speed ratio is increased to 12 to 1.

If the maximum vehicle speed is 40 k.p.h. (25 m.p.h.) its speed may be increased from a crawl of 3.3 k.p.h. (2 m.p.h.) to full speed by the normal use of the accelerator pedal. Over this speed range the power loss is made up of friction loss in the belt plus the watts lost in the field resistance.

The starting resistor R is in circuit only until the motor reaches that fraction of full speed at which the starting current equals the full load current. The watts lost in the starting resistor is reduced by the parallel connection of the batteries at starting.

The total power loss over the entire speed range is acceptably small and the drive provides smooth speed control with low power loss.

With the drive in the full forward speed condition shown in FIG. 3, if the accelerator pedal A is now released and allowed to return to its rest position the vehicle will continue to travel forward but the drive pulley faces will tend to open and the follower pulley faces will tend to close.

The pulley speed ratio will therefore automatically reverse and the vehicle will now tend to drive the motor M at a faster speed than its previous motoring speed, but in the same direction. The action tending to open the drive pulley faces is reinforced by the pressure of the left hand sloping face of the drive pulley slot 15 on the drive pin 12.

In addition to increasing the motor speed, the field resistance F is also cut out of circuit to give full field strength. The effect of releasing the accelerator pedal, therefore is to automatically maximise the two variables in the generated voltage equation, speed and field strength. The machine now acts as a generator of correct polarity, returns power to the battery through T, and the vehicle decelerates.

Thus, regenerative deceleration occurs and this will continue until the generated voltage equals the battery voltage or until the accelerator pedal is again depressed and motoring recommences. The vehicle is fitted with standard hydraulic brakes but regenerative braking may also be introduced if required. In that event, the free play of the brake pedal may actuate the series-parallel controller to connect the battery halves in parallel through T to the generator.

The direct drive described above has the following advantages: (a) speed control with low power loss, (b) automatic regenerative deceleration, and (c) optimum speed/load characteristic. The embodiment of the invention now to be described, with reference to FIG. 4 further has the advantage of automatic differential action.

Figure 4:
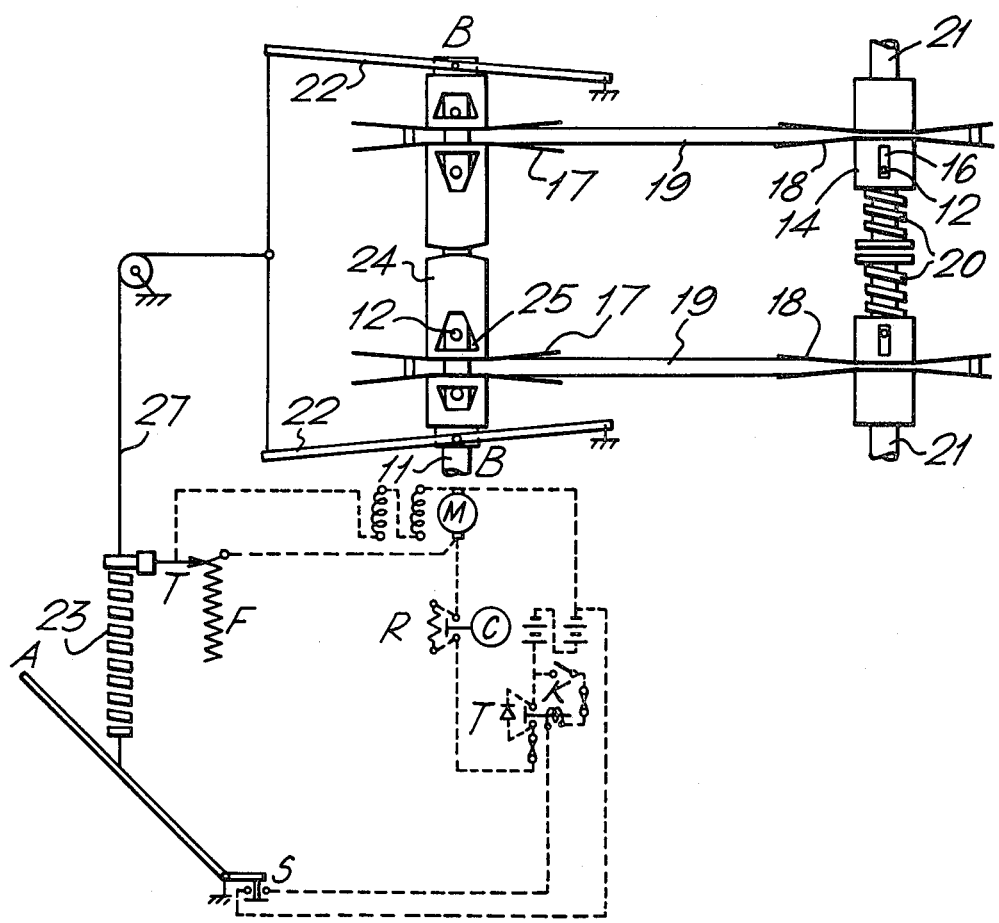
FIG. 4 shows schematically a differential drive according to the invention.

In the differential drive of FIG. 4, components performing the same or an equivalent function as in FIG. 1 have been given the same reference numerals. The main difference lies in the construction and number of pulleys. Two drive pulleys 17 each driving a respective follower pulley 18 are provided, the drive pulleys 17 being driven by a common motor shaft 11 but each follower pulley 18 driving a respective rear wheel of the vehicle via a respective load shaft 21.

Figure 5:
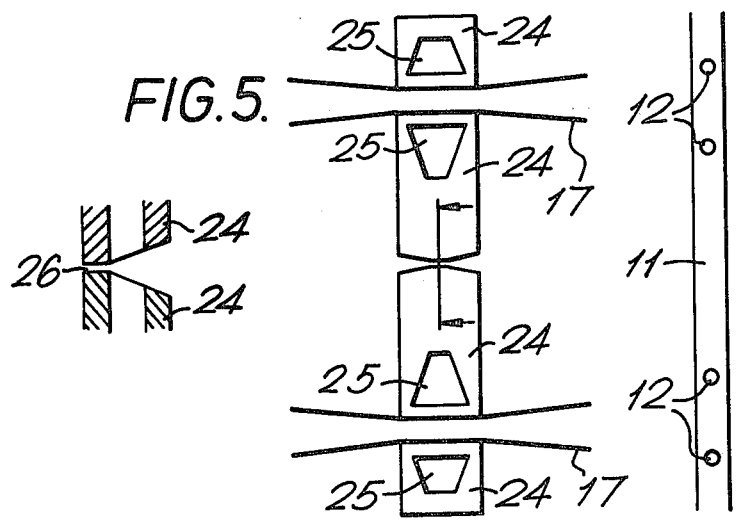
FIG. 5 shows schematically the component parts of the drive pulleys used in the FIG. 4 embodiment.

FIG. 5 shows the component parts of the drive pulleys 17 used in the differential drive. Each pulley face is fixed to a separate sleeve 24 which can slide along the drive shaft 11. Each sleeve has a trapezium shaped or other slot 25 with sloping sides as shown. The drive shaft has four tapped holes to receive four drive pins 12 and the unit is assembled by inserting the drive pins through the slots in the sleeves as shown in FIG. 4.

The abutting ends of the two inside sleeves 24 are each cut at an angle as shown in section on the left hand side of FIG. 5, leaving a flat portion 26 where each inside sleeve may slide on the other.

FIG. 4 shows the assembled differential drive in the at rest condition. The accelerator pedal A when depressed pulls a flexible steel wire 27 which tends to close the faces of both drive pulleys 17 via respective levers 22.

It is assumed that both rear wheels of a conventional 4 wheel vehicle are driven and that clockwise rotation of the motor drives the vehicle forward. The motor is started in the normal way and the drive pins 12 press on the right hand faces of the slots 25 to drive the vehicle forward.

When the vehicle in which the drive is assumed to be incorporated is moving along a straight path, the operation of each associated pair of drive and follower pulleys is in principle the same as that already discussed in relation to FIG. 1 and straight line motion will not be further discussed.

Considering first, therefore, differential action during forward drive, for any given vehicle speed and accelerator pedal position the effect of turning a corner is that the inner rear wheel slows down to a speed less than the mean vehicle speed while the outer rear wheel speeds up to a speed greater than the mean vehicle speed.

This means that the load on the inner drive pulley is increased and the pulley faces tend to open while the load on the outer drive pulley is reduced and its pulley faces tend to close.

The combined effect of these two forces acting cumulatively is that both of the abutting inside sleeves 24 move in the direction from the inner drive pulley to the outer pulley until the new equilibrium position is reached and the power is again transmitted equally to each wheel.

Each inside sleeve 24 is free to slide on the flat portion 26 of the other inside sleeve and the flat surfaces are of sufficient length to ensure that normal differential action always takes place within the limit of contact of both flat surfaces.

Considering next the differential action during forward deceleration, the vehicle is now driving the motor as a generator and each left hand sloping face of the drive pulley slots 25 is pressing on the drive pins 12 tending to keep the drive pulley faces open. On turning a corner, the inner wheel is constrained to move slower than the mean vehicle speed. This reduces the pressure exerted by the inner drive pulley on its drive pins and allows the inner drive pulley faces to close and/or the outer drive pulley faces to open, until the new equilibrium position is reached and power is again transmitted equally from each wheel to the generator.

Differential action during reverse drive takes place in a similar manner to that described during forward drive but the drive now operates in the reverse direction and special provision may need to be made to limit the vehicle speed in the reverse direction.

Differential action in the reverse deceleration mode is also similar to that described under the forward deceleration mode but the drive now operates in the reverse direction and special provision need not be made for regenerative deceleration in the reverse direction.

Under the normal operation power is transmitted from the motor M to each rear wheel or from each rear wheel to the motor acting as a generator. If the brakes are applied when the vehicle is travelling in the forward direction, one rear wheel only may skid while the other rear wheel may still be acting in the forward deceleration mode.

In this situation, each right-hand sloping face of the skidding rear wheel drive pulley slots is in contact with its drive pin while each left hand sloping face of the other drive pulley slots is in contact with its drive pin.

Figure 6:
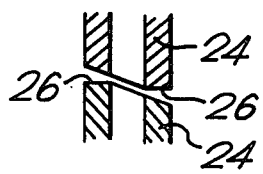
FIG. 6 shows the relative positions of the abutting sleeves of the drive pulleys of FIG. 4 in a skid condition.

The result is that the abutting inner sleeves 24 are turned 180° relative to each other from the normal flat surface differential action position shown on the left of FIG. 5 to the angular contact position shown in FIG. 6. This causes the inside pulley faces to move towards each other and the skidding wheel drive pulley faces open to such an extent that the drive to this wheel disengages. The normal differential action working area of each of the inside pair of drive pins 12 is at the narrow end of its slot. The wider end of the slot comes into use only under single wheel skid conditions. When the skidding wheel resumes rotation, the inside sleeves 24 return to their normal flat surface differential action position shown at the left of FIG. 5.

The variable speed drives described above provide a convenient method of transmitting the power in a battery powered electric vehicle as well as having the advantages previously referred to. They have the further advantages of simplicity, low initial cost, and low maintenance costs. The component parts are available commercially and the manufacturing processes are well within the limits of current technology.

The drives may be designed to suit the use requirement of a particular vehicle, flexibly linking the parameters vehicle weight, payload and battery energy density to achieve optimum results. The drives may be used on present-day batteries which have comparatively low energy densities and their design flexibility ensures that the maximum advantage is obtained from the higher energy densities as they become available from developments in battery technology.

The drives may also be used to transmit power from an internal combustion engine or other prime power source or in a hybrid vehicle where the internal combustion engine runs at optimum speed.

I claim:

1. A variable speed drive for a battery-powered electric vehicle, the drive comprising a drive pulley of variable effective diameter mounted on a drive shaft, a follower pulley of variable effective diameter mounted on a driven shaft, a flexible belt passing around both pulleys and serving to transmit power from the drive pulley to the follower pulley, means for automatically adjusting the effective diameter of the follower pulley in accordance with that of the drive pulley to maintain the flexible belt under tension, manually-operable accelerator means resiliently coupled to the drive pulley for applying a manually adjustable force thereto tending to increase the effective diameter of the drive pulley and thereby increase the drive ratio to the pulleys, and means mechanically coupling the drive shaft to the drive pulley for automatically applying an opposite force to the drive pulley tending to decrease the effective diameter thereof and thereby decrease the drive ratio of the pulleys, the opposite force having a magnitude which increases with increasing load torque and vice versa, the arrangement being such that a constant drive ratio between the pulleys is obtained when the two opposing forces on the drive pulley are in equilibrium and the drive ratio between the pulleys falls with increasing load and vice versa.

2. A drive as claimed in claim 1, wherein the flexible belt is a V-belt and the drive pulley comprises two opposite conical faces mounted on a drive shaft for rotation therewith, at least one face being slidably mounted on the drive shaft whereby variations in the effective diameter of the pulley are achieved by the said one face sliding on the shaft towards or away from the other face.

3. A drive as claimed in claim 2, wherein the accellerator means comprises a pedal coupled via a spring under tension to the said one face, depression of the pedal causing movement of the said one face towards the other face so as to increase the effective diameter of the drive pulley.

4. A drive as claimed in claim 2, wherein the mechanical coupling means for automatically applying an opposite force to the drive pulley comprises a first element secured to the drive shaft which cooperates with a second element secured to the said one face in such manner that with increasing load the said one face is forced in a direction away from the other face, the first element further cooperating with the second element to effect rotation of the said one face with the drive shaft.

5. A drive as claimed in claim 4, wherein the first element is a pin secured to the drive shaft and the second element is an apertured sleeve secured to the said one face, the pin being located in the aperture and the side of the aperture engaged by the pin when the shaft is driven being sloped relative to the axis of the shaft.

6. A drive as claimed in claim 5, wherein the opposite side of the aperture is sloped in the opposite direction to the first mentioned side whereby when the follower pulley is decelerating after the removal of drive power from the drive shaft the pin engages the said opposite side of the aperture to force the said one face in a direction away from the other face.

7. A drive as claimed in claim 4, wherein the follower pulley also comprises two opposite conical faces, one face being slidably mounted on an output shaft and the other face being secured non-slidably on the output shaft, the two faces of the follower pulley being constrained to rotate with the output shaft and the means for maintaining the belt under tension including means biassing the slidably mounted face of the follower pulley towards the other face.

8. A drive as claimed in claim 4, wherein the other face of the drive pulley is secured to the drive shaft in nonslidable manner.

9. A differential variable speed drive comprising a combination of two variable speed drives as claimed in claim 4, the two drives having a common drive shaft on which the two drive pulleys are mounted with their other faces secured to respective sleeves which are slidably mounted on the drive shaft and abut one another, the two drives further having a common accelerator means which acts to simultaneously increase the effective diameter of each drive pulley.

10. A differential drive as claimed in claim 9 wherein the sleeves of the said other drive pully faces have respective aperatures which cooperate with respective pins on the drive shaft, each pin being located in its respective aperture and the side of the latter engaged by the pin when the shaft is driven being sloped relative to the axis of the shaft in such manner that with increasing load the said other face is forced in a direction away from the said one face.

11. A differential drive as claimed in claim 9 wherein the abutting sleeves have respective flat surface portions perpendicular to the axis of the drive shaft, which flat surface portions are arranged to abut during differential action of the drive, and respective sloped surface portions which are arranged to abut, by rotation of one sleeve relative to the other, if during braking of the follower pulleys one follower pulley stops rotating while the other follower pulley continues to rotate, the abutment of the sloped surface portions serving to decrease the distance between the said other faces of the drive pulleys whereby the separation of the opposite conical faces of the drive pulley associated with the non-rotating follower pulley increases to such an extent that the drive between the non-rotating follower pulley and its drive pulley disengages.

12. A drive as claimed in claim 2 wherein the follower pulley also comprises two opposite conical faces, one face being slidably mounted on an output shaft and the other face being secured non-slidably on the output shaft, the two faces of the follower pulley being constrained to rotate with the output shaft and the means for maintaining the belt under tension including means biassing the slidably mounted face of the follower pulley towards the other face.

13. A differential variable speed drive comprising a combination of two variable speed drives as claimed in claim 12, the two drives having a common drive shaft on which the two drive pulleys are mounted with their other faces secured to respective sleeves which are slidably mounted on the drive shaft and abut one another, the two drives further having a common accelerator means which acts to simultaneously increase the effective diameter of each drive pulley.

14. A differential drive as claimed in claim 13 wherein the sleeves of the said other drive pulley faces have respective apertures which cooperate with respective pins on the drive shaft, each pin being located in its respective aperature and the side of the latter engaged by the pin when the shaft is driven being sloped relative to the axis of the shaft in such manner that with increasing load the said other face is forced in a direction away from the said one face.

15. A differential drive as claimed in claim 13 wherein the abutting sleeves have respective flat surface portions perpendicular to the axis of the drive shaft, which flat surface portions are arranged to abut during differential action of the drive, and respective sloped surface portions which are arranged to abut, by rotation of one sleeve relative to the other, if during braking of the follower pulleys one follower pulley stops rotating while the other follower pulley continues to rotate, the abutment of the sloped surface portions serving to decrease the distance between the said other faces of the drive pulleys whereby the separation of the opposite conical faces of the drive pulley associated with the non-rotating follower pulley increases to such an extent that the drive between the non-rotating follower pulley and its drive pulley disengages.

16. A drive as claimed in claim 2, wherein the drive pulley is driven by a shunt wound electric motor, the amount of field resistance in the circuit of the motor being dependent upon the effective diameter of the drive pulley in such manner that with increasing effective diameter the amount of field resistance increases.

17. A differential variable speed drive comprising a combination of two variable speed drives as claimed in claim 2, the two drives having a common drive shaft on which the two drive pulleys are mounted with their other faces secured to respective sleeves which are slidably mounted on the drive shaft and abut one another, the two drives further having a common acelarator means which acts to simultaneously resiliently increase the effective diameter of each drive pulley.

18. A differential drive as claimed in claim 17 wherein the sleeves of the said other drive pully faces have respective aperatures which cooperate with respective pins on the drive shaft, each pin being located in its respective aperature and the side of the latter engaged by the pin when the shaft is driven being sloped relative to the axis of the shaft in such manner that with increasing load the said other face is forced in a direction away from the said one face.

19. A differential drive as claimed in claim 17, wherein the drive shaft is driven by a shunt wound electric motor, the amount of field resistance in the circuit of the motor being dependent upon the separation of the said one faces of the two drive pulleys in such manner that with increasing separation the amount of field resistance increaes.

20. A differential drive as claimed in claim 17, wherein the abutting sleeves have respective flat surface portions perpendicular to the axis of the drive shaft, which flat surface portions are arranged to abut during differential action of the drive, and respective sloped surface portions which are arranged to abut, by rotation of one sleeve relative to the other, if during braking of the follower pulleys one follower pulley stops rotating while the other follower pulley continues to rotate, the abutment of the sloped surface portions serving to decrease the distance between the said other faces of the drive pulleys whereby the separation of the opposite conical faces of the drive pulley associated with the non-rotating follower pulley increases to such an extent that the drive between the non-rotating follower pulley and its drive pulley disengages.

21. A differential drive as claimed in claim 20 wherein the drive shaft is driven by a shunt wound electric motor, the amount of field resistance in the circuit of the motor being dependent upon the separation of the said one faces of the two drive pulleys in such manner that with increasing separation the amount of field resistance increases.

* * * * *